(12) United States Patent
Yokochi

(10) Patent No.: US 7,697,163 B2
(45) Date of Patent: Apr. 13, 2010

(54) IMAGE PROCESSING APPARATUS, IMAGE PROCESSING METHOD, AND IMAGE PROCESSING PROGRAM FOR DISTINGUISHING PIXELS OF AN EDGE PORTION

(75) Inventor: Atsushi Yokochi, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1119 days.

(21) Appl. No.: 10/943,861

(22) Filed: Sep. 20, 2004

(65) Prior Publication Data

US 2005/0088673 A1 Apr. 28, 2005

(30) Foreign Application Priority Data

Sep. 25, 2003 (JP) ............... P. 2003-333745

(51) Int. Cl.
*G06F 15/00* (2006.01)
*H04N 1/409* (2006.01)
*H04N 1/46* (2006.01)
*G03F 3/08* (2006.01)
*G06K 9/00* (2006.01)
*G06K 9/18* (2006.01)
*G06K 9/03* (2006.01)

(52) U.S. Cl. ............... 358/1.9; 358/515; 358/518; 358/529; 358/532; 358/3.26; 382/167; 382/182; 382/310

(58) Field of Classification Search ............ 358/2.1, 358/1.9, 515, 518, 529, 532; 382/167, 182, 382/310

See application file for complete search history.

(56) References Cited

U.S. PATENT DOCUMENTS

| 5,014,124 | A | * | 5/1991 | Fujisawa | 358/530 |
| 2003/0048958 | A1 | * | 3/2003 | Ishiguro | 382/261 |
| 2003/0169442 | A1 | * | 9/2003 | Yokochi | 358/1.9 |

FOREIGN PATENT DOCUMENTS

| JP | A 3-213057 | | 9/1991 |
| JP | 08237475 A | * | 9/1996 |
| JP | A 8-237475 | | 9/1996 |
| JP | B2 3100383 | | 8/2000 |
| JP | B2 3260816 | | 12/2001 |

* cited by examiner

*Primary Examiner*—Twyler L Haskins
*Assistant Examiner*—Fred Guillermety
(74) *Attorney, Agent, or Firm*—Oliff & Berridge, PLC

(57) ABSTRACT

An image processing apparatus has a generation section that generates color component of each pixel forming an image by of a usual method or a generation for black edge; a black edge determination section that determines whether or not each pixel is a black edge pixel forming the black edge based on peripheral pixels of the pixel; a dot detection section that detects dot information of each pixel based on peripheral pixels of the pixel; and a method instruction section that instructs the generation section on what method is to be used for generating color component based on results provided by the black edge determination section and the dot detection section, wherein the method instruction section instructs the generation section to generate color component of a pixel, which is not determined as the black edge pixel or whose detection result is a specific detection result, by the usual method.

10 Claims, 6 Drawing Sheets

IMAGE PROCESSING APPARATUS, IMAGE PROCESSING METHOD, AND IMAGE PROCESSING PROGRAM FOR DISTINGUISHING PIXELS OF AN EDGE PORTION

BACKGROUND OF THE INVENTION

1. Field of the Invention

The invention relates to an image processing apparatus that performs image processing for image data, and an image processing method and an image processing program that can be used in the image processing apparatus.

2. Description of the Related Art

To record original image data made up of R (Red), G (Green), and B (Blue) components provided by reading an original image through a scanner in a printer in a scanner, etc., it is a common practice to convert the original image data into C (Cyan), M (Magenta), and Ye (Yellow) components in accordance with color components of ink used for recording and then generate a K (Black) component from the C, M, and Ye components and subtract the K component from the C, M, and Ye components to execute under color removal (UCR), thereby generating a record image made up of the C, M, Ye, and K components.

In the area represented in black in the original image, color spreading occurs in the edge portion (boundary between black and any other color than black) if the record positions of C, M, and Ye components shift slightly in the record image.

Thus, in recent years, the color component generation method using under color removal has been changed between the edge portion and any other portion so as to decrease the C, M, and Ye components in the edge portion more than those in any other portion. Accordingly, the percentage of the C, M, and Ye components in the edge portion becomes lower than that in any other portion, so that occurrence of color spreading caused as the record positions of the C, M, and Ye components shift can be suppressed.

To execute such under color removal, it is necessary to determine whether or not each of the pixels making up an image is a pixel forming a part of an edge portion in a black area. However, it is generally difficult to accurately determine whether or not the pixel is a pixel in the edge portion, and the pixel not to be determined a pixel in the edge portion may be erroneously determined a pixel in the black area.

For example, as for pixels making up a dot area, the pixel indicating each dot in the dot area is easily determined erroneously a pixel in an edge portion.

If the pixels making up a dot area are thus erroneously determined pixels in an edge portion, the percentage of the K component in the pixels increases and therefore the record image has the area corresponding to the dot area recorded in improper dark color, and the original image is not faithfully reproduced.

To prevent such an erroneous determination, for example, if no edge pixels exist in the pixel periphery determined an edge portion, it is possible to enhance the accuracy of the determination according to an art wherein the corresponding pixels are determined pixels making up an area represented in halftone rather than the edge portion (JP-A-H3-213057), an art wherein whether or not pixels detected to be pixels making up a character based on the edge density using continuity of a line forming a character are correct is determined from the peripheral pixels (surrounding pixel information) (JP-B-3100383), or the like.

JP-A-H3-213057 and JP-B-3100383 are referred to as related art.

The above-described arts can enhance the accuracy of the determination, but are not sufficient to prevent the original image from being unfaithfully reproduced because an erroneous determination can occur.

SUMMARY OF THE INVENTION

The object of the invention is to provide an image processing apparatus, an image processing method and an image processing program that prevent an original image from being unfaithfully reproduced caused by that pixels making up a dot area are erroneously determined as pixels making up an edge portion.

The invention provides an image processing apparatus having: a generation section that generates at least one color component required for reproducing color of each pixel making up an image displayed by processing image data by means of either of a usual generation method and a generation method for black edge indicated by black color; a black edge determination section that determines whether or not each pixel of the image is a black edge pixel forming the black edge based on peripheral pixels of the pixel; a dot detection section that detects dot information of each pixel of the image based on peripheral pixels of the pixel; and a generation method instruction section that instructs the generation section on what generation method is to be used for generating color component based on a result provided by the black edge determination section and a result provided by the dot detection section, wherein the generation method instruction section instructs the generation section to generate color component of a pixel, which is not determined as the black edge pixel by the black edge determination section or whose detection result provided by the dot detection section is a specific detection result, by using the usual generation method. The generation method instruction section may instruct the generation section to generate color component of a pixel, which is determined the black edge pixel by the black edge determination section or whose detection result provided by the dot detection section is other than a specific detection result, by using the generation method for black edge.

Therefore, if the pixel of the image indicated by the image data forming a part of the dot area is erroneously determined a black edge pixel, the color component generation method for the pixel can be inhibited from being changed to the generation method for black edge depending on whether or not the pixel is a dot.

Thus, if the image indicated by the image data is recorded, improper dark color can be prevented from being recorded, so that it is made possible to faithfully reproduce the original image.

The invention also provides an image processing method including: a black edge determination step of determining whether or not each pixel making up an image displayed by processing image data is a black edge pixel forming a black edge indicated by black color based on peripheral pixels of the pixel; a dot detection step of detecting dot information of each pixel of the image based on peripheral pixels of the pixel; a generation method determination step of determining which of a usual generation method and a generation method for black edge is to be used for generating color component of the pixel based on a result provided in the black edge determination step and a result provided in the dot detection section; and a generation step of generating color component of the pixel by using a generation method determined in the generation method determination step, wherein, in the generation method determination step, it is determined that color component of a pixel, which is not determined as the black edge pixel in the black edge determination step or whose detection result provided in the dot detection step is a specific detection result, is generated by using the usual generation method. Further, in the generation method determination step, it may be determined that color component of a pixel, which is determined as the black edge pixel in the black edge determination step or whose detection result provided in the dot detection step is other than a specific detection result, is generated by using the generation method for black edge.

Therefore, a similar image to the image provided by the image processing apparatus can be provided.

The invention also provides a program for use in an image processing apparatus having: a generation section that generates at least one color component required for reproducing color of each pixel making up an image displayed by processing image data by means of either of a usual generation method and a generation method for black edge indicated by black color; a black edge determination section that determines whether or not each pixel of the image is a black edge pixel forming the black edge based on peripheral pixels of the pixel; a dot detection section that detects dot information of each pixel of the image based on peripheral pixels of the pixel; and a generation method instruction section that instructs the generation section on what generation method is to be used for generating color component based on a result provided by the black edge determination section and a result provided by the dot detection section, wherein the generation method instruction section instructs the generation section to generate color component of a pixel, which is not determined as the black edge pixel by the black edge determination section or whose detection result provided by the dot detection section is a specific detection result, by using the usual generation method.

The computer system for executing the above program can implement a part of the image processing apparatus.

DETAILED DESCRIPTION OF THE PREFERRED EMBODIMENTS

An embodiment of the invention will be discussed.

Figure 1:
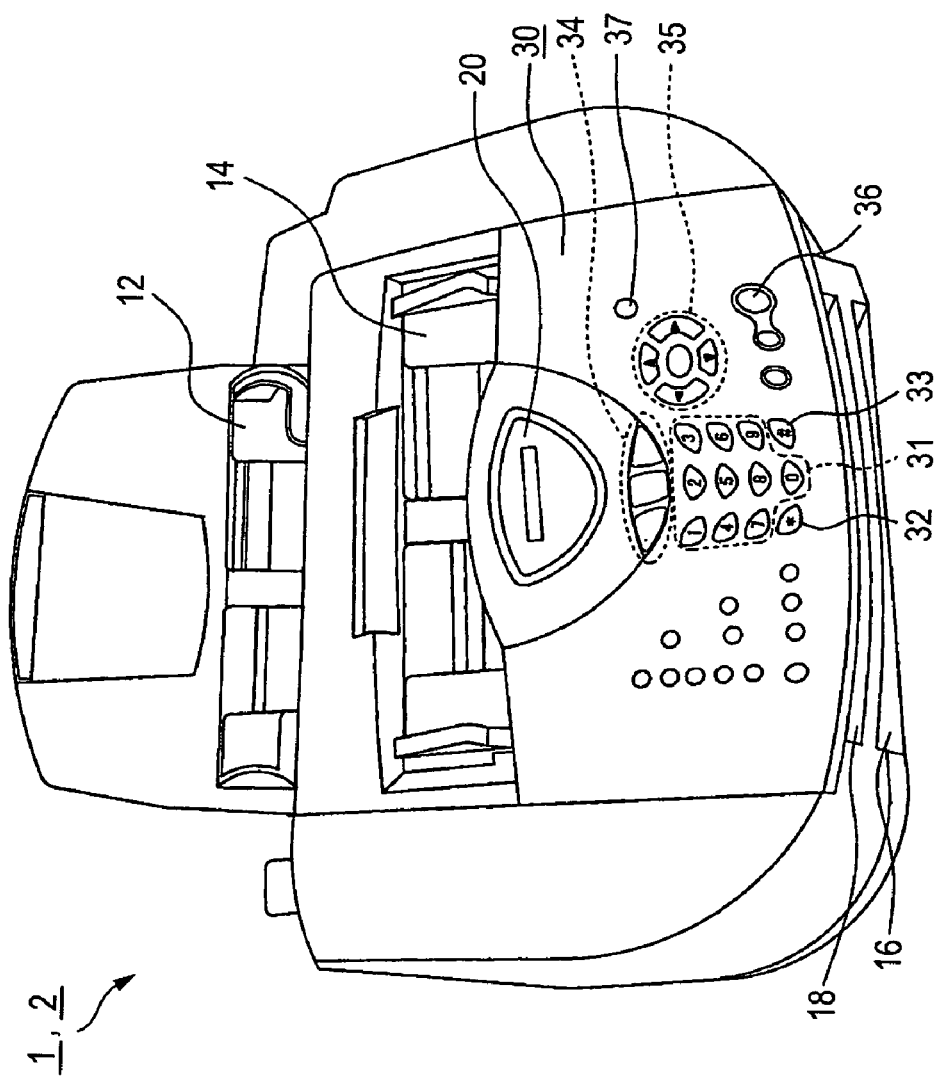
FIG. 1 is a perspective view to show the appearance of a multifunction processing machine.
Figure 2:
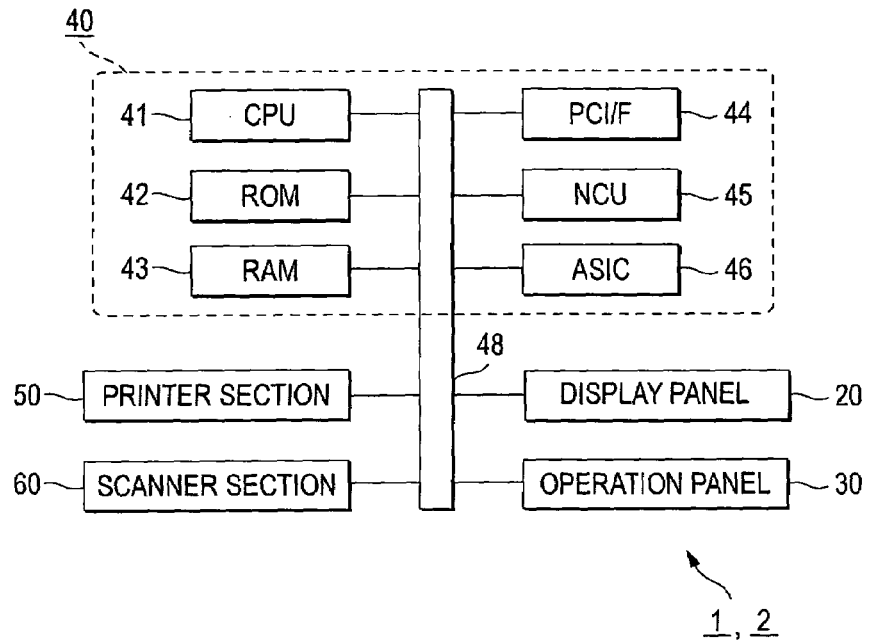
FIG. 2 is a block diagram to show the configuration of the multifunction processing machine.

A multifunction processing machine 1 is an apparatus having functions of a printer, a copier, a scanner, and a facsimile. As shown in FIG. 1, the multifunction processing machine 1 includes a record paper feed section 12 disposed at the rear of the main unit; a read paper feed section 14 disposed at the rear of the top of the main unit; a record paper ejection section 16 and a read paper ejection section 18 disposed on the front of the main unit; a display panel 20 disposed at the center of the top face of the main unit; an operation panel 30 disposed on the front of the top of the main unit, and the like. The multifunction processing machine 1 also contains a control section 40 for controlling the whole operation of the multifunction processing machine 1, a printer section 50, a scanner section 60, etc., as shown in FIG. 2.

The operation panel 30 is made up of digit buttons of 0 to 9, an * button 32, a # button 33, a function button 34 to switch the function to be used (among the copy function, the scanner function, and the facsimile function), a set button 35 for setting for each function, a start button 36, a power button 37, and the like.

A control section 40 includes a CPU 41, ROM 42, RAM 43, a PC interface section (PCI/F) 44, an NCU (network control unit) 45, an ASIC (Application-Specific Integrated Circuit) 46, and the like, which are connected by a bus 48.

The CPU 41 sends commands to the components of the multifunction processing machine 1 via the bus 48 while storing the processing result in the RAM 43 in accordance with a processing procedure previously stored in the ROM 42, thereby controlling the whole operation of the multifunction processing machine 1. The PCI/F 44 is an interface for connecting the multifunction processing machine 1 to another known personal computer (PC) via a communication cable so as to enable data communications therebetween. The NCU 45 is an interface for connecting the multifunction processing machine 1 to a telephone network. The ASIC 46 is an integrated circuit formed with a circuit for performing image processing for image data indicating an image read through the scanner section 60, and the like.

The printer section 50 is a component for recording an image on paper while transporting paper set in the record paper feed section 12 to the record paper ejection section 16. The record system in the printer section 50 may be an ink jet system, a laser record system, or a thermal transfer system. That is, any system may be adopted if it can record an image, text, etc., on a record medium such as paper.

The scanner section 60 is a component for reading the image recorded on an original as image data while transporting the original set in the read paper feed section 14 to the read paper ejection section 18. The scanner section 60 reads the original image as an image made up of R (red), G (green), and B (blue) component images defined in an RGB color model.

In the described the multifunction processing machine 1, if the user presses the start button 36 in a state in which the function to be used is switched into the copy function as the user presses the function button 34, the control section 40 copies the original set in the read paper feed section 14.

Roughly, first the scanner section 60 is commanded to read an image from the original set in the read paper feed section 14. Then, the scanner section 60 reads the original image as image data, which will be hereinafter referred to as "input image data," in response to the command. The input image data is input to the ASIC 46 for performing image processing. Then, the printer section 50 is commanded to record the image subjected to the image processing (output image) on paper set in the record paper feed section 12. Thus, the printer section 50 copies the original set in the read paper feed section 14.

Here, details of the image processing performed for the input image data by the ASIC 46 will be discussed based on the circuit configuration formed in the ASIC 46. To input the input image data to the ASIC 46, data of a unit image made up of m×n pixels (in the embodiment, "5×5") centering on a specific pixel ("attention pixel") in the input image indicated by the input image data, which will be hereinafter referred to as "unit data," is input at a time.

Figure 3:
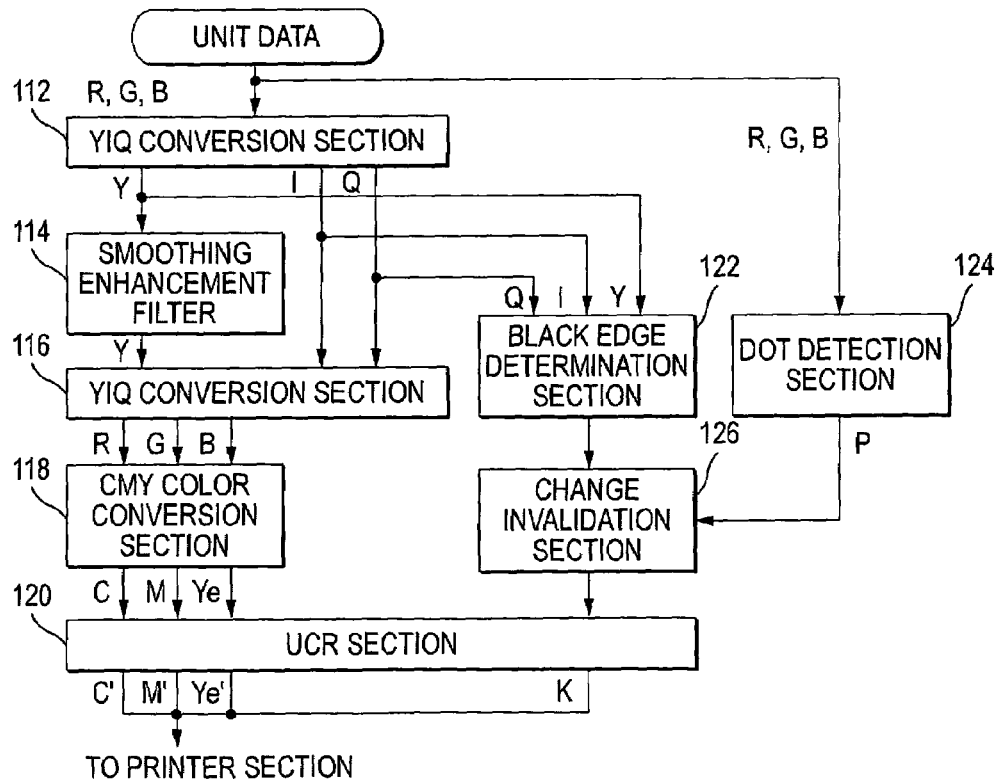
FIG. 3 is a block diagram to show the circuit configuration formed in an ASIC in an embodiment of the invention.

The ASIC 46 is formed with a YIQ conversion section 112, a smoothing enhancement filter 114, a YIQ inverse conversion section 116, a CMY color conversion section 118, a UCR section 120, a black edge determination section 122, a dot detection section 124, a change invalidation section 126, and the like, as shown in FIG. 3.

The YIQ conversion section 112 converts the unit image indicated by externally input unit data into an image made up of Y (luminosity), I (in-phase), and Q (quadrature) components defined in a YIQ color model.

The smoothing enhancement filter 114 is a spatial filter for filtering the Y component of the Y, I, and Q components provided by the YIQ conversion section 112, and outputs the component provided by performing smoothing and edge enhancement for the Y component of the attention pixel in the unit image.

The YIQ inverse conversion section 116 again converts the I and Q components of the attention pixel in the unit image provided by the YIQ conversion section 112 and the Y component of the attention pixel filtered through the smoothing enhancement filter 114 into the attention pixel made up of R, G, and B components.

The CMY color conversion section 118 converts the attention pixel provided by the YIQ inverse conversion section 116 into a pixel made up of C (cyan), M (magenta), and Ye (yellow) components defined in a CMY color model.

The UCR section 120 generates a K (black) component from the C, M, and Ye color components of the attention pixel provided by the CMY color conversion section 118 and subtracts the K component from the C, M, and Ye color components to generate C', M', and Ye' components for providing a pixel made up of the C', M', and Ye' components and the K component. If a command signal is input from the black edge determination section 122 described below, the UCR section 120 replaces the color components of the attention pixel with only the K component.

If the attention pixel in the unit image provided by the YIQ conversion section 112 is a pixel forming a part of the edge portion of an area represented in black (boundary between the black area and an area represented in any other color than black; for example, the edge portion of a character represented in black or the like), which will be hereinafter referred to as "black edge pixel," the black edge determination section 122 outputs a command signal through the change invalidation section 126 to the UCR section 120 for commanding the UCR section 120 to replace the color components of the attention pixel with only the K component.

Figure 4:
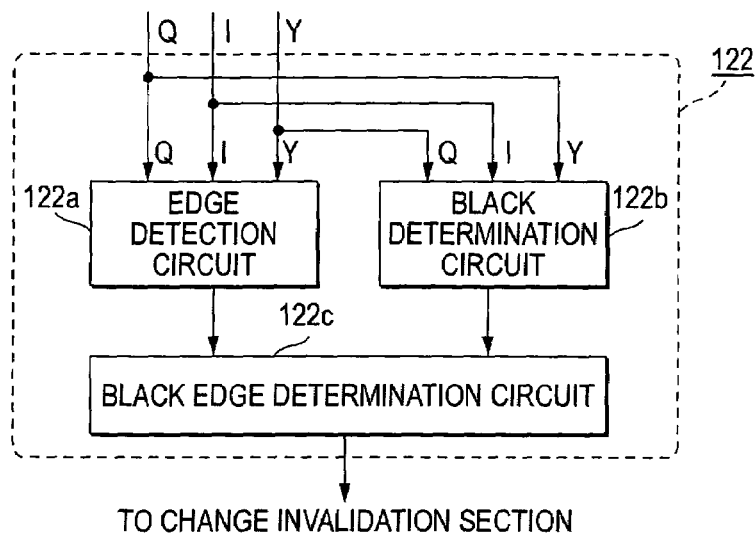
FIG. 4 is a block diagram to show the internal configuration of a black edge determination section.

Determination of black edge and output of the command signal are performed by an edge detection circuit 122a, a black determination circuit 122b, and a black edge determination circuit 122c, as shown in FIG. 4. First, the unit image provided by the YIQ conversion section 112 is processed by the edge detection circuit 122a and the black determination circuit 122b. The edge detection circuit 122a detects an edge from the unit image by filtering (in the embodiment, using a sobel filter) and if an edge is detected, outputs a detection signal. On the other hand, the black determination circuit 122b determines whether or not the attention pixel is a pixel represented in black based on the color components of the attention pixel in the unit image. If the black determination circuit 122b determines that the attention pixel is a pixel represented in black, it outputs a determination signal. If both the detection signal from the edge detection circuit 122a and the determination signal from the black determination circuit 122b are input to the black edge determination circuit 122c, the black edge determination circuit 122c determines that the attention pixel is a black edge pixel, and outputs a command signal to the change invalidation section 126. That is, if the black edge determination section 122 determines that the attention pixel is a black edge pixel, it outputs a "1" (H (high)) command signal; if the black edge determination section 122 does not determine that the attention pixel is a black edge pixel, it outputs a "0" (L (low)) command signal.

The dot detection section 124 detects dot degree P of the attention pixel in the unit image based on each pixel of the unit image indicated by externally input unit data, and outputs a dot signal indicating the detected dot degree P to the change invalidation section 126. The dot degree P is detected at any of stages of $0, 1, \ldots, m \times n$ (=25) based on the color components of the attention pixel and the peripheral pixels of the attention pixel. Specifically, if the component (density) of the attention pixel is the maximum value or the minimum value among the pixels making up the unit image, the value responsive to the absolute value of the difference between the total values of pixel pairs placed symmetrically with respect to the point (attention pixel) $(1, \ldots, m \times n)$ becomes the dot degree. On the other hand, if the component of the attention pixel is not the maximum value or the minimum value among the pixels making up the unit image, 0 becomes the dot degree. The procedure for detecting the dot degree P is the same as the procedure disclosed in JP-A-H8-237475 and therefore will not be discussed again here in detail. In JP-A-H8-237475, if each of evaluation values is greater than a predetermined threshold value, determination of a dot is made; in the embodiment, any value of $1, \ldots, m \times n$ responsive to the averages of evaluation values is detected as the dot degree.

If the dot degree P indicated by a dot signal output from the dot detection section 124 is less than a predetermined threshold value (in the embodiment, P=20), the change invalidation section 126 connects the path from the black edge determination section 122 to the UCR section 120, thereby allowing the command signal to pass through. On the other hand, if the dot degree P is equal to or greater than the predetermined threshold value, the change invalidation section 126 opens the path from the black edge determination section 122 to the UCR section 120, thereby inhibiting the command signal from passing through. The above-described threshold value is predetermined, but can be changed as desired upon reception of an external command (for example, user's operation through the operation panel 30).

Figure 5:
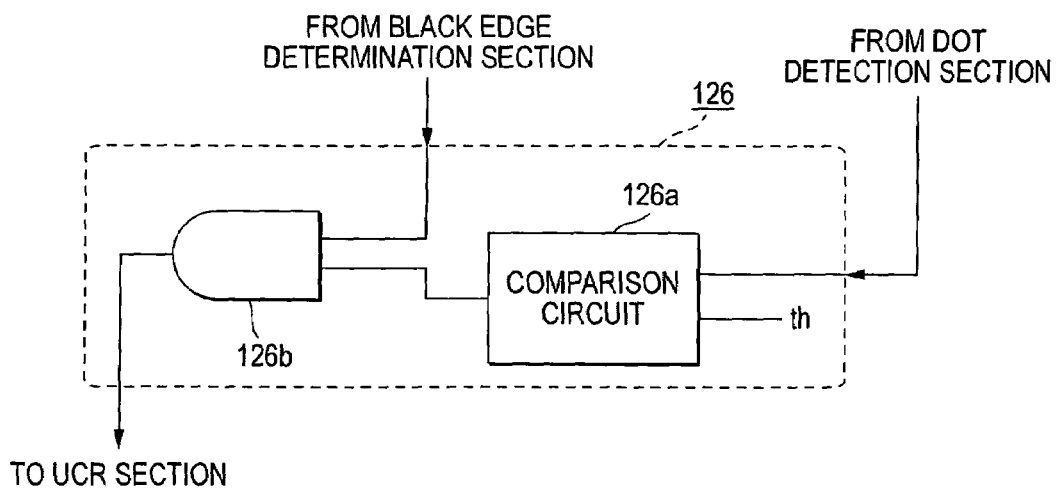
FIG. 5 is a block diagram to show the internal configuration of a change invalidation section.

Whether or not the command signal is allowed to pass through is determined by a comparison circuit 126a and an AND circuit 126b, as shown in FIG. 5. The comparison circuit 126a is implemented as a known comparator, etc. First, a dot signal output by the dot detection section 124 is input to the comparison circuit 126a, which then compares the dot signal input from the dot detection section 124 with a reference signal "th" indicating the above-described predetermined threshold value (P=20). If the signal level of the dot signal is equal to or greater than the signal level of the reference signal "th," namely, the dot degree P is equal to or greater than the threshold value, the comparison circuit 126a outputs a "0" (L) signal. On the other hand, if the signal level of the dot signal is less than the signal level of the reference signal "th," namely, the dot degree P is less than the threshold value, the comparison circuit 126a outputs a "1" (H) signal.

The output signal of the comparison circuit 126a and the command signal from the black edge determination section 122 are input to the AND circuit 126b. If both inputs are "1," the AND circuit 126b outputs a "1" (H) signal to the UCR section 120; if either is "0," the AND circuit 126b outputs a "0" (L) signal to the UCR section 120. The output signal of the comparison circuit 126a input to the AND circuit 126b becomes "1" if the dot degree P is less than the threshold value. Thus, if the dot degree P is less than the threshold value, the command signal from the black edge determination section 122 is allowed to pass through to the UCR section 120. On the other hand, if the dot degree P is equal to or greater than the threshold value, the command signal from the black edge determination section 122 is not allowed to pass through to the UCR section 120, and the determination result of the black edge determination section 122 is invalidated.

In the ASIC 46 involving such a circuit configuration, the input image data input every unit data is first input to the YIQ conversion section 112 and the dot detection section 124.

Figure 6:
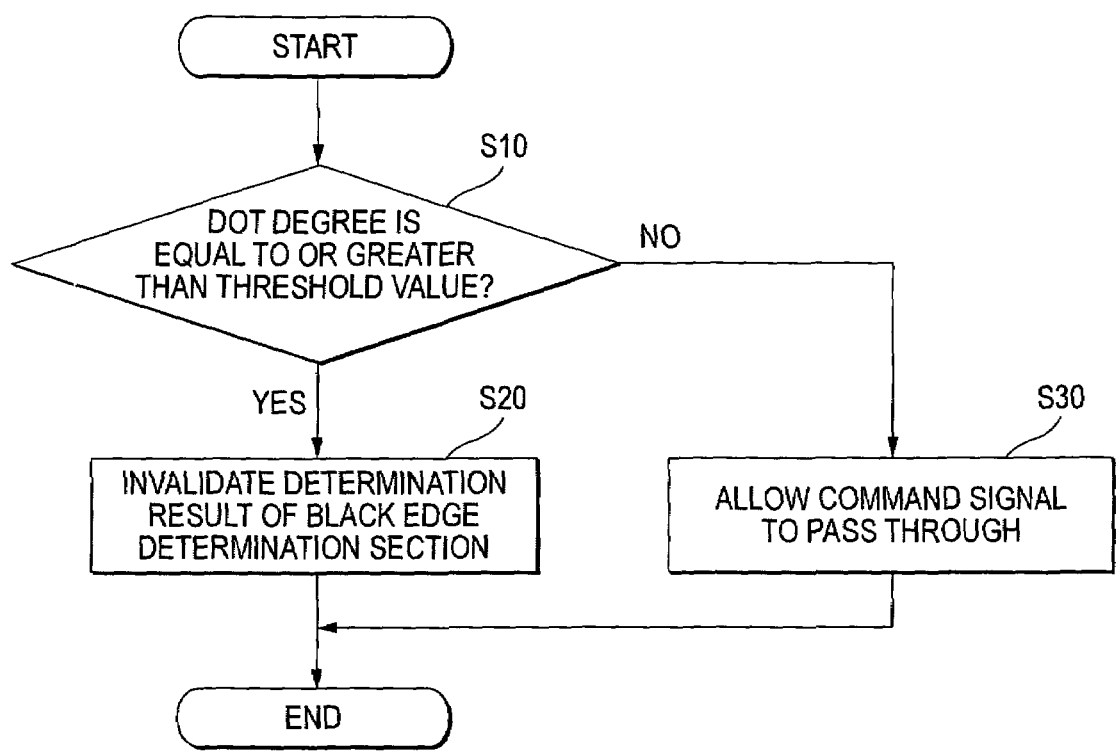
FIG. 6 is a flowchart to represent processing of the change invalidation section.

The dot detection section 124 detects the dot degree P of the attention pixel in the unit image based on the input unit data, and outputs the dot signal indicating the dot degree P to the change invalidation section 126. If the dot degree P indicated by the dot signal is equal to or greater than the predetermined threshold value, the change invalidation section 126 receiving the dot signal allows the command signal to pass through the path from the black edge determination section 122 to the UCR section 120. On the other hand, if the dot degree P indicated by the dot signal is less than the predetermined threshold value, the change invalidation section 126 does not allow the command signal to pass through the path from the black edge determination section 122 to the UCR section 120, and the determination result of the black edge determination section 122 is invalidated. Thus, if the dot degree P of the attention pixel in the unit image is equal to or greater than the threshold value (YES at s10), the change invalidation section 126 invalidates the determination result of the black edge determination section 122 (s20); on the other hand, if the dot degree P is less than the threshold value (NO at s10), the change invalidation section 126 allows the command signal to pass through (s30), as shown in FIG. 6.

On the other hand, the YIQ conversion section 112 converts the input unit data into the unit data indicating the unit image made up of Y, I, and Q components.

Then, the provided image made up of the Y, I, and Q components has only the Y component filtered through the smoothing enhancement filter 114 and then is converted into the image data indicating the attention pixel made up of R, G, and B components by the YIQ inverse conversion section 116.

Subsequently, the provided attention pixel made up of the R, G, and B components is converted into a pixel made up of C, M, and Ye components defined in the CMY color model.

Figure 7A:
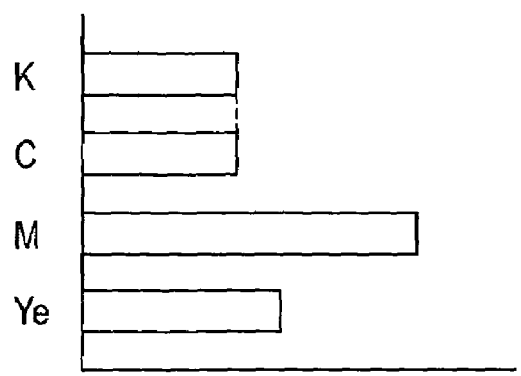
FIGS. 7A to 7D are drawings to show color component addition and subtraction procedures of under color removal.
Figure 7B:
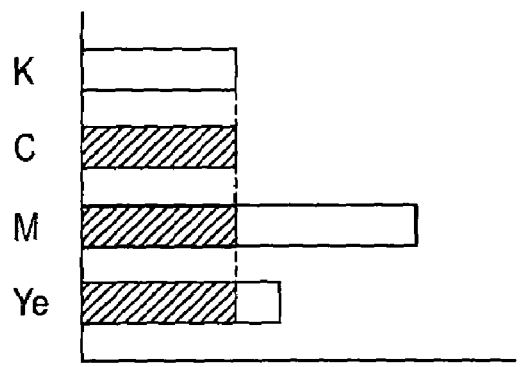
Figure 7C:
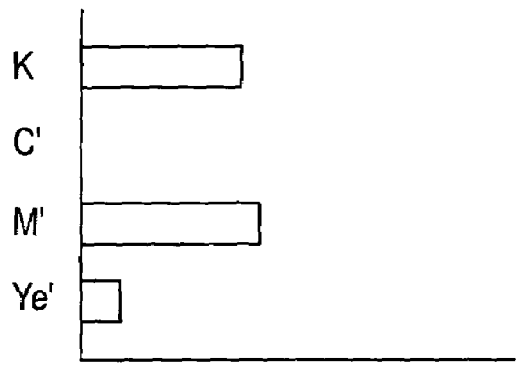

The provided attention pixel made up of the C, M, and Ye components is subjected to under color removal by the UCR section 120. If the path to the UCR section 120 is opened because a command signal is not output from the black edge determination section 122 or the dot degree of the attention pixel is equal to or greater than the threshold value although a command signal is output (namely, the attention pixel is determined a black edge pixel), a K (black) component is generated from the C, M, and Ye components for the attention pixel and the K component is subtracted from the C, M, and Ye components to generate C', M', and Ye' components for providing a pixel made up of the C', M', and Ye' components and the K component, namely, usual under color removal is executed. On the other hand, if the path to the UCR section 120 is connected because a command signal is output from the black edge determination section 122 and the dot degree of the attention pixel is less than the threshold value, under color removal for black edge is executed for replacing the C, M, and Ye components with only the K component. The expression "usual under color removal" in the embodiment is used to mean processing wherein the K component of the same value as the minimum component of the C, M, and Ye components is added (see FIG. 7A) and then the same value as the added K component is subtracted from each of the C, M, and Ye components to generate C', M', and Ye' components (see FIGS. 7B and 7C).

The image data indicating the attention pixel made up of the C', M', and Ye' components provided by the UCR section 120 or the image data indicating the attention pixel provided by replacing the C, M, and Ye components with only the K component by the UCR section 120 is sent to the printer section 50 in order. After all unit data has been sent, the printer section 50 records the image indicated by the image data.

Advantages of the Embodiment

According to the ASIC 46 of the multifunction processing machine 1 thus configured, even if the black edge determination section 122 erroneously determines that a pixel (attention pixel) forming a part of a dot area of an input image indicated by input image data is a black edge pixel, if the attention pixel has a dot degree equal to or greater than the threshold value, under color removal for black edge is not executed for the pixel.

Thus, if the printer section 50 records the image indicated by the image data thus subjected to the image processing, it is made possible to faithfully reproduce the original image read through the scanner section 60 without recording improper dark color at the position corresponding to the dot area.

Further, in the configuration, the threshold value of the dot degree to suppress under color removal for black edge can be set for the optimum dot degree in response to the dot resolution in the dot area, the resolution of the scanner section 60, etc., for example.

The dot area is implemented as a set of dots and is an image with the light and dark of color represented in the dot size. To read an image containing such a dot area through the scanner section 60, if the resolution of the scanner section 60 is sufficiently higher than the dot resolution in the dot area, the dots making up the image cannot accurately be read and a noise component of moire, etc., occurs.

It is also possible to make alternative detection as to whether or not the input image data thus read is dots; however, the original image cannot sufficiently be reproduced and thus degradation of the accuracy of the detection is inevitable and the erroneous detection result is easily produced. If the detection result is erroneous, although the pixel is a black edge pixel, under color removal for black edge is suppressed for the pixel, resulting in occurrence of color spreading.

Thus, setting the threshold value in response to the dot degree as described above is useful for preventing under color removal for black edge from being suppressed for the black edge pixel if the resolution of the scanner section 60 is not sufficiently higher than the dot resolution in the dot area.

The black edge pixels forming a part of an input image are reproduced only with the K component, so that occurrence of color spreading caused by shifts in the record positions of the C, M, and Ye components can be prevented reliably.

The change invalidation section 126 can open the path from the black edge determination section 122 to the UCR section 120 for each pixel whose dot degree P detected by the dot detection section 124 is equal to or greater than the predetermined threshold value, thereby invalidating the determination result of the black edge determination section 122.

[Modifications]

Although the embodiment of the invention has been described, it is to be understood that the invention is not limited to the specific embodiment thereof and various modifications and changes may be made.

For example, in the embodiment, the component ASIC 46 corresponding to an image processing apparatus in the invention is included in the multifunction processing machine by way of illustration. However, the component corresponding to the image processing apparatus in the invention can also be adopted for any other configuration than the multifunction processing machine.

In the embodiment, the circuits corresponding to the image processing apparatus in the invention are formed in the ASIC 46 by way of illustration. However, the circuits may be formed in a PLD (Programmable Logic Device), etc., rather than the ASIC 46.

In the embodiment, the dot detection section 124 detects the dot degree of each attention pixel at a plurality of stages by way of illustration. However, the dot detection section 124 may make alternative detection as to whether or not the attention pixel is a dot.

According to the ASIC 46 of the multifunction processing machine 1 thus configured, even if the black edge determination section 122 erroneously determines that a pixel (attention pixel) forming a part of a dot area of an input image indicated by input image data is a black edge pixel, if the attention pixel is a pixel detected as a dot, under color removal for black edge is not executed for the pixel. Thus, if the printer section 50 records the image indicated by the image data thus subjected to the image processing, it is made possible to faithfully reproduce the original image read through the scanner section 60 without recording improper dark color at the position corresponding to the dot area.

Figure 7D:
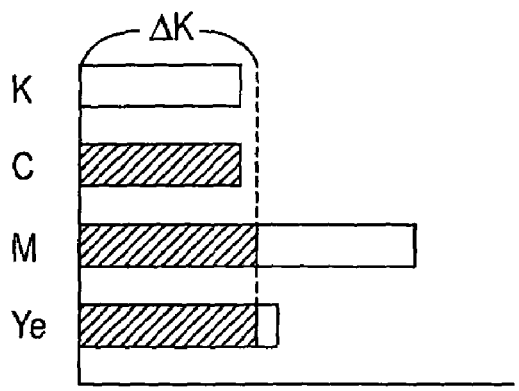

In the embodiment, "under color removal for black edge" is processing of replacing the C, M, and Ye components with only the K component by way of illustration. However, "under color removal for black edge" may be processing wherein the K component of the same value as the minimum component of the C, M, and Ye components is added (see FIG. 7A) and then a value k resulting from multiplying the added K component by a coefficient of 1 or more (positive value) is subtracted from each of the C, M, and Ye components (see FIG. 7D), for example.

In the embodiment, the change invalidation section 126 does not allow a command signal to pass through the path from the black edge determination section 122 to the UCR section 120, whereby the black edge determination section 122 does not execute under color removal for black edge by way of illustration. However, the configuration for the change invalidation section 126 to inhibit execution of under color removal for black edge is not limited; for example, it is also possible to adopt a configuration for opening the path from the YIQ conversion section 112 to the black edge determination section 122.

In the embodiment, the image processing performed by the ASIC 46 may be executed by software by the CPU 41. A processing procedure for the CPU 41 to execute the image processing performed by the ASIC 46 will be discussed with FIG. 8. The processing is executed when input image data is read through the scanner section 60, and the image indicated by the input image data read through the scanner section 60 is made up of first to x-th pixels.

First, black edge pixels of the input image indicated by the input image data are determined and the positions (coordinates) of the black edge pixels in the input image are recorded in the RAM 43 (s110). As the processing for determining the black edge pixels, similar processing to that performed by the black edge determination section 122 described above is performed for all pixels of the input image.

Next, the dot degree of each of the pixels making up the input image indicated by the input image data is detected (s120). As the processing for determining the dot degree, similar processing to that performed by the dot detection section 124 described above is performed for all pixels of the input image.

Next, a correction is made for deleting the position of each pixel whose dot degree detected at s120 is lower than a predetermined threshold value (20) from the positions of the black edge pixels recorded in the RAM 43 at s110.

Next, the input image indicated by the input image data is converted into an image made up of Y, I, and Q components (s140). As the processing for converting the image into an image made up of Y, I, and Q components, similar processing to that of the YIQ conversion section 112 described above is performed for all pixels of the input image.

Next, the Y component of the image provided at s140 is filtered (s150). Similar processing to the filtering of the smoothing enhancement filter 114 described above is performed for all pixels of the Y-component image.

Next, the image made up of the I and Q components of the Y, I, and Q components provided at s140 and the Y component filtered at s150 is converted into an image made up of R, G, and B components (s160). As the processing for converting the image into an image made up of R, G, and B components, similar processing to that of the YIQ inverse conversion section 116 described above is performed for all pixels of the image made up of the Y, I, and Q components.

Next, the image made up of the R, G, and B components provided at s160 is converted into an image made up of C, M, and Ye components (s170). As the processing for converting the image into an image made up of C, M, and Ye components, similar processing to that of the CMY color conversion section 118 described above is performed for all pixels of the image made up of the R, G, and B components.

Next, under color removal is executed for the image made up of the C, M, and Ye components provided at s170 (s180). As the processing for executing the under color removal, similar processing to that of the UCR section 120 described above is performed for all pixels of the image made up of the C, M, and Ye components. Specifically, under color removal for black edge is executed for the pixels whose positions are recorded in the RAM 43, of the image made up of the C, M, and Ye components to replace the C, M, and Ye components with only the K component, and usual under color removal is executed for other pixels to add the K (black) component and subtract from the C, M, and Ye components.

The image data indicating the image made up of the C', M', and Ye' components (or the C', M', Ye', and K components) subjected to the under color removal at s180 is output to the printer section 50 (s190).

In the embodiment, the ASIC 46 functions as the image processing apparatus; the CMY color conversion section 118 and the UCR section 120 of the ASIC 46 function as the generation section; the black edge determination section 122 functions as the black edge determination section; and the dot detection section 124 functions as the dot detection section; and the change invalidation section 126 functions as the generation method instruction section.

Figure 8:
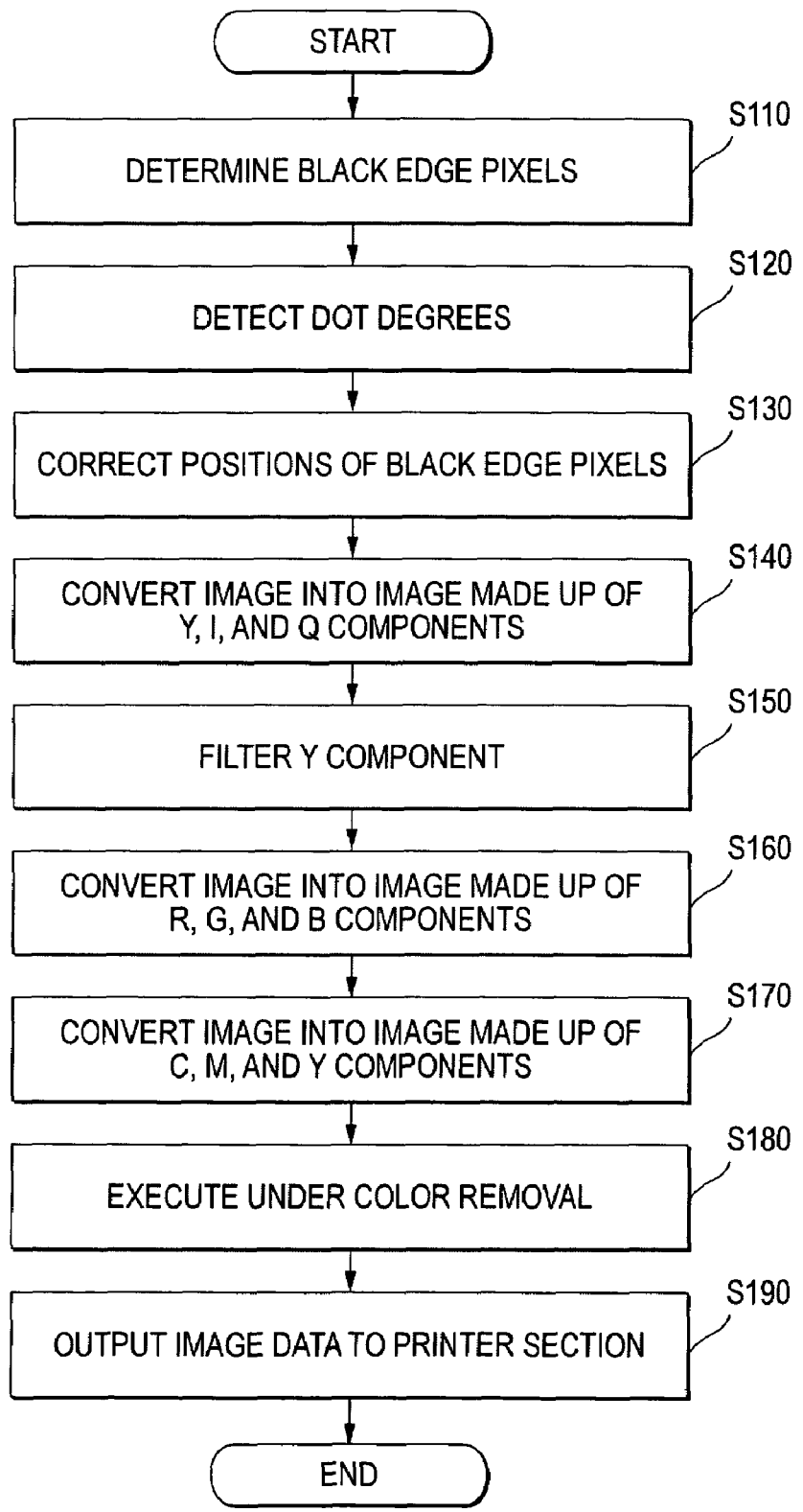
FIG. 8 is a flowchart to show a processing procedure for a CPU to execute image processing performed by an ASIC.

In the modification for executing the processing in FIG. 8, the CPU 41 and the RAM 43 function as the image processing apparatus; step s110 functions as the black edge determination section; step s120 functions as the dot detection section; step s130 functions as is the generation method instruction section; and steps s170 and s180 function as the generation section.

The "generation method for black edge," the color component generation method executed for the pixels determined black edge pixels by the generation means, is a generation method of making higher the percentage of the black component in the color components generated for the same pixel than the color components generated in the usual generation method. As a specific example, the generation section generates the color component of the pixel with only a black component as the generation method for black edge.

In this case, each black edge pixel is reproduced only with the black component, so that occurrence of color spreading caused by shifts in the record positions of the color components can be prevented reliably.

The dot detection section determines whether or not each pixel of the image is a pixel forming a part of a dot area; for example, it may detect whether or not the pixel is a pixel forming a part of a dot area. In this case, the dot information may indicate whether or not the pixel is a dot pixel forming a part of a dot area, and the specific detection result may be a result that the pixel is determined as the dot pixel by the dot detection section.

Therefore, if the pixel of the image indicated by the image data forming a part of the dot area is erroneously determined a black edge pixel, the color component generation method for the pixel is not changed to the generation method for black edge. Thus, if the image indicated by the image data is recorded, improper dark color is not recorded in the area corresponding to the dot area, and it is made possible to faithfully reproduce the original image.

The dot detection means can also detect dot degree indicating the extent to which each pixel of the image is a pixel forming a part of a dot area in the image. In this case, the dot information may indicate a dot degree of the pixel, and the specific detection result may be a dot degree which is equal to or greater than a predetermined threshold value.

Therefore, even if the pixel of the image indicated by the image data forming a part of the dot area is erroneously determined a black edge pixel, if the pixel has a dot degree equal to or greater than the threshold value, the color component generation method for the pixel is not changed to the generation method for black edge. Thus, if the image indicated by the image data is recorded, improper dark color is not recorded in the area corresponding to the dot area, and it is made possible to faithfully reproduce the original image.

Further, as the threshold value to inhibit the generation method from being changed, the optimum dot degree can be set in response to the dot resolution in the dot area, the resolution of the scanner, etc., for example.

The dot area is implemented as a set of dots and is an image with the light and dark of color represented in the dot size. To read an image containing such a dot area through the scanner, if the resolution of the scanner is sufficiently higher than the dot resolution in the dot area, the dots making up the image cannot accurately be read and a noise component of moire, etc., occurs. That is, the input image data thus read cannot sufficiently reproduce the original image and thus to make alternative detection as to whether or not the image data is dots, degradation of the accuracy of the detection is inevitable and the erroneous detection result is easily produced. If the detection result is erroneous, although the pixel is a black edge pixel, the color component generation method for the pixel is not changed to the generation method for black edge, resulting in occurrence of color spreading.

Thus, setting the threshold value in response to the dot degree as described above is useful for preventing the color component generation method for the black edge pixel from being not changed to the generation method for black edge if the resolution of the scanner is not sufficiently higher than the dot resolution in the dot area.

In the image processing method, the color component of the pixel with only a black component as the generation method for black edge may be generated in the generation step.

Therefore, occurrence of color spreading caused by shifts in the record positions of the color components can be prevented reliably.

In the image processing method, the dot information may indicate whether or not the pixel is a dot pixel forming a part of a dot area, and the specific detection result may be a result that the pixel is determined as the dot pixel by the dot detection section.

Therefore, if the pixel of the image indicated by the image data forming a part of the dot area is erroneously determined a black edge pixel, the color component generation method for the pixel is not changed to the generation method for black edge. Thus, if the image indicated by the image data is recorded, improper dark color is not recorded in the area corresponding to the dot area, and it is made possible to faithfully reproduce the original image.

The dot information may indicate a dot degree of the pixel, and the specific detection result may be a dot degree which is equal to or greater than a predetermined threshold value.

Therefore, even if the pixel of the image indicated by the image data forming a part of the dot area is erroneously determined a black edge pixel, if the pixel has a dot degree equal to or greater than the threshold value, the color component generation method for the pixel is not changed to the generation method for black edge. Thus, if the image indicated by the image data is recorded, improper dark color is not recorded in the area corresponding to the dot area, and it is made possible to faithfully reproduce the original image.

The image processing program is made up of numbered rows of instructions suited for processing of the computer system; it is a program for causing a computer system to execute the functions of the means include in the image processing apparatus. The program is provided for the image processing apparatus, the computer system, or the user using the apparatus or the system via a record medium such as an FD (floppy disk (registered trademark)), a CD-ROM (compact disk-read-only memory), or a memory card, a communication network of the Internet, etc., or the like, for example. As the computer system for executing the program, a computer system incorporated in the image processing apparatus, a computer system connected to the image processing apparatus so that they can communicate data to each other by radio or over a wire communication line.

What is claimed is:

1. An image processing apparatus comprising:
a conversion execution section that converts input image data pixels, including red, green, and blue components, pixel by pixel, into output image data pixels, including cyan, magenta, yellow, and black components, by executing a first color conversion suitable for a black edge and by executing a second color conversion not suitable for the black edge;
a black edge determination section that determines whether each input image data pixel of the input image data pixels is a black edge pixel forming the black edge, based on peripheral pixels of an input image data pixel, by determining whether the input image data pixel satisfies both a condition that the input image data pixel forms an edge and a condition that a color of the input image data pixel is black;

a dot detection section that determines whether each input image data pixel is a dot pixel, by detecting dot information of the input image data pixel based on the peripheral pixels of the input image data pixel; and a conversion instruction section that instructs the conversion execution section, based on a result determined by the black edge determination section and a result determined by the dot detection section, to convert the color components of the input image data pixel determined as the black edge pixel by executing the first color conversion suitable for the black edge;

wherein:
when the input image data pixel is determined as the black edge pixel and is determined as the dot pixel, the conversion instruction section instructs the conversion execution section to execute the second conversion not suitable for the black edge and to not execute the first conversion suitable for the black edge, the first color conversion converts the image data of the cyan, magenta and yellow components into the image data of the cyan, magenta, yellow and black components, and the second color conversion converts the image data of the cyan, magenta and yellow components into the image data of the cyan, magenta, yellow and black components, the first color conversion generates a black component from the cyan, magenta and yellow components and subtracts a product of the black component multiplied by a coefficient of 1 or more from the cyan, macienta and yellow components, the second color conversion generates a black component from the cyan, magenta and yellow components, and the second color conversion subtracts the black component from the cyan, magenta and yellow components, and an amount of the cyan, magenta and yellow components that is generated by the first color conversion is zero or smaller than that of an amount of the cyan, magenta and yellow components generated by the second color conversion.

2. The image processing apparatus according to claim 1, wherein the dot information indicates a dot degree of the input image data pixel, and the dot detection section determines the input image data pixel is the dot pixel if the dot degree is equal to or greater than a predetermined threshold value.

3. The image processing apparatus according to claim 1, wherein the conversion execution section converts the color component of the input image data pixel into only a black component by executing the first color conversion suitable for the black edge.

4. The image processing apparatus according to claim 1, wherein:
the conversion execution section includes a first sub-conversion execution portion that converts the input image data pixels, including red, green, and blue components, pixel by pixel, into intermediate data; and the black edge determination section determines whether the input image data pixel is the black edge pixel based on the intermediate data converted by the first sub-conversion execution portion.

5. The image processing apparatus according to claim 4, wherein the intermediate data includes luminosity, in-phase, and quadrature components.

6. The image processing apparatus according to claim 1, wherein the conversion execution section includes:

a first sub-conversion execution portion that converts the input image data pixels, including red, green, and blue components, pixel by pixel, into pixels of image data, including cyan, magenta, and yellow components and not including black components; and a second sub-conversion execution portion that converts the input image data pixels converted by the first sub-conversion execution portion into the output image data pixels, including cyan, magenta, yellow, and black components.

7. The image processing apparatus according to claim 6, wherein the first sub-conversion execution portion executes a same conversion in both of the first color conversion suitable for black edge and the second color conversion not suitable for black edge.

8. The image processing apparatus according to claim 6, wherein the second sub-conversion execution portion executes different conversions according to an instruction from the conversion instruction section whether the first color conversion suitable for black edge is to be executed.

9. An image processing method comprising:
inputting input image data pixels, including red, green, and blue components;

determining whether each input image data pixel of the input image data pixels is a black edge pixel forming a black edge, based on peripheral pixels of an input image data pixel, by determining whether the input image data pixel satisfies both a condition that the input image data pixel forms an edge and a condition that a color of the input image data pixel is black;

determining whether each input image data pixel is a dot pixel, by detecting dot information of the input image data pixel based on the peripheral pixels of the input image data pixel;

determining, based on a result determined in the determining the black edge and a result determined in the determining dot pixel, to convert the color components of the input image data pixel determined as the black edge pixel by executing a first color conversion suitable for the black edge, wherein when the input image data pixel is determined as the black edge pixel and is determined as the dot pixel, it is determined to convert the color components of the input image data pixel by executing a second color conversion not suitable for the black edge and not by executing the first conversion suitable for the black edge; and executing the first color conversion or the second color conversion to convert the input image data pixels, including red, green, and blue components, into output image data pixels, including cyan, magenta, yellow, and black components, wherein:
the first color conversion converts the image data of the cyan, magenta and yellow components into the image data of the cyan, magenta, yellow and black components, and the second color conversion converts the image data of the cyan, magenta and yellow components into the image data of the cyan, magenta, yellow and black components, the first color conversion generates a black component from the cyan, magenta and yellow components and subtracts a product of the black component multiplied by a coefficient of 1 or more from the cyan, macienta and yellow components, the second color conversion generates a black component from the cyan, magenta and yellow components, and the second color conversion subtracts the black component from the cyan, magenta and yellow components, and an amount of the cyan, magenta and yellow components that is generated by the first color conversion is zero or smaller than that of an amount of the cyan, magenta and yellow components generated by the second color conversion.

10. A computer-readable medium storing a computer-executable program, the computer-executable program comprising:
- (a) instructions for inputting input image data pixels, including red, green, and blue components;
- (b) instructions for determining whether each input image data pixel of the jiput image data pixels is a black edge pixel forming a black edge, based on peripheral pixels of an input image data pixel, by determining whether the input image data pixel satisfies both a condition that the input image data pixel forms an edge and a condition that a color of the input image data pixel is black;
- (c) instructions for determining whether the input image data pixel is a dot pixel, by detecting dot information of the input image data pixel based on the peripheral pixels of the input image data pixel;
- (d) instructions for determining, based on a result of the determining execution (b) and a result of the determining execution (c), to convert the color components of the input image data pixel determined as the black edge pixel by executing the first color conversion suitable for the black edge, wherein when the input image data pixel is determined as the black edge pixel and is determined as the dot pixel, the determining execution (d) determines to convert the color components of the input image data pixel by executing a second color conversion not suitable for the black edge and not by executing the first conversion suitable for the black edge; and
- (e) instructions for executing the first color conversion or the second color conversion, based on a determination result by the determining execution (d), to convert the input image data pixels, including red, green, and blue components, into output image data pixels, including cyan, magenta, yellow, and black components, wherein:
the first color conversion converts the image data of the cyan, magenta and yellow components into the image data of the cyan, magenta, yellow and black components, and the second color conversion converts the image data of the cyan, magenta and yellow components into the image data of the cyan, magenta, yellow and black components, the first color conversion generates a black component from the cyan, magenta and yellow components and subtracts a product of the black component multiplied by a coefficient of 1 or more from the cyan, magenta and yellow components, the second color conversion generates a black component from the cyan, magenta and yellow components, and the second color conversion subtracts the black component from the cyan, magenta and yellow components, and an amount of the cyan, magenta and yellow components that is generated by the first color conversion is zero or smaller than that of an amount of the cyan, magenta and yellow components generated by the second color conversion.

* * * * *